(12) United States Patent
Kauniskangas et al.

(10) Patent No.: US 9,183,552 B2
(45) Date of Patent: Nov. 10, 2015

(54) METHOD AND APPARATUS FOR PROVIDING AUTOMATED PAYMENT WITH AN AUDIO TOKEN

(75) Inventors: Hannu Sakari Kauniskangas, Oulu (FI); Timo Pekka Tervo, Oulu (FI); Kirmo Kalevi Koistinen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 421 days.

(21) Appl. No.: 13/078,405

(22) Filed: Apr. 1, 2011

(65) Prior Publication Data

US 2011/0258121 A1   Oct. 20, 2011

Related U.S. Application Data

(60) Provisional application No. 61/324,134, filed on Apr. 14, 2010.

(51) Int. Cl.
*G06Q 20/00* (2012.01)
*G06Q 20/32* (2012.01)
*G06Q 20/20* (2012.01)
*G06Q 20/36* (2012.01)

(52) U.S. Cl.
CPC .......... *G06Q 20/3272* (2013.01); *G06Q 20/20* (2013.01); *G06Q 20/3674* (2013.01)

(58) Field of Classification Search
USPC .............. 705/16, 21, 59, 67, 71; 380/44, 262, 380/278, 279
See application file for complete search history.

(56) References Cited

U.S. PATENT DOCUMENTS

| 7,251,730 | B2  | 7/2007  | Rose et al. |
| 7,676,835 | B2* | 3/2010  | Brannon et al. ................ 726/10 |
| 8,701,166 | B2* | 4/2014  | Courtney et al. ................. 726/5 |
| 2004/0158565 | A1* | 8/2004 | Kakuta et al. .................... 707/10 |
| 2005/0097320 | A1* | 5/2005 | Golan et al. ..................... 713/166 |
| 2005/0154925 | A1* | 7/2005 | Chitrapu et al. ............... 713/202 |
| 2005/0177484 | A1* | 8/2005 | Jentoft ............................. 705/35 |
| 2005/0228720 | A1  | 10/2005 | Pavlic et al. |
| 2006/0196412 | A1* | 9/2006 | Mutz et al. ...................... 117/95 |

(Continued)

FOREIGN PATENT DOCUMENTS

| CN | 1889436 A | 1/2007 |
| CN | 101464982 A | 6/2009 |

(Continued)

OTHER PUBLICATIONS

"Automated teller machine," Wikipedia article, accessed May 30, 2011.

(Continued)

*Primary Examiner* — Dante Ravetti
(74) *Attorney, Agent, or Firm* — Ditthavong & Steiner, P.C.

(57) ABSTRACT

An approach is provided for conducting transactions via an audio token base payment system. An audio payment manager receives a request, at a device, for payment to a merchant, the request including a password. In response, the audio payment manager retrieves a personal identification number from a user of the device, an identifier associated with the user, a session code, or a combination thereof. The audio payment manager then generates an audio token at the device based, at least in part, on the password, the personal identification number, the identifier associated with the user, the session code, or the combination thereof, and causes, at least in part, conveyance of the audio token to the merchant to initiate the payment.

12 Claims, 13 Drawing Sheets

(56) References Cited

U.S. PATENT DOCUMENTS

| | | | | |
|---|---|---|---|---|
| 2006/0294392 | A1* | 12/2006 | Veprek et al. | 713/183 |
| 2007/0067833 | A1* | 3/2007 | Colnot | 726/9 |
| 2007/0190975 | A1 | 8/2007 | Eonnet | |
| 2008/0249947 | A1* | 10/2008 | Potter | 705/67 |
| 2008/0288405 | A1* | 11/2008 | John | 705/44 |
| 2009/0104888 | A1* | 4/2009 | Cox | 455/410 |
| 2010/0106647 | A1 | 4/2010 | Raman | |
| 2010/0243732 | A1 | 9/2010 | Wallner | |
| 2011/0213706 | A1* | 9/2011 | Joshi et al. | 705/44 |
| 2013/0138779 | A1* | 5/2013 | Krikorian et al. | 709/219 |

FOREIGN PATENT DOCUMENTS

| | | |
|---|---|---|
| FR | 2 886 753 A1 | 12/2006 |
| FR | 2 892 545 A1 | 4/2007 |
| WO | 0051280 A2 | 8/2000 |
| WO | WO 00/51280 A2 | 8/2000 |
| WO | WO 02/05078 A2 | 1/2002 |
| WO | WO 02/33669 A1 | 4/2002 |
| WO | WO 03/088165 A1 | 10/2003 |
| WO | WO 2006/131668 A2 | 12/2006 |
| WO | WO 2007/048976 A2 | 5/2007 |
| WO | WO 2008/007162 A1 | 1/2008 |
| WO | WO 2008/038161 A2 | 4/2008 |

OTHER PUBLICATIONS

"Message authentication code," Wikipedia article, accessed May 30, 2011.
"One-time password," Wikipedia article, accessed May 30, 2011.
International Search Report for corresponding PCT Application No. PCT/FI2011/050254, Jun. 1, 2011, pp. 1-5.
Paterson, et al., "One-time-password-authenticated key exchange," Sep. 4, 2009, pp. 1-15.
Written Opinion for corresponding PCT Application No. PCT/FI2011/050254, Jun. 1, 2011, pp. 1-9.
Cost of Identity Theft, Samson, Marc, CEO Intelligent Switched Systems, http://www.iswitched.com/pdf/cost.pdf, Feb. 7, 2004, pp. 1-2.
Margento, http://www.margento.com, accessed on: May 16, 2011, pp. 1-2.
Mobile payment, http://en.wikipedia.org/wiki/Mobile_payment, May 8, 2011, pp. 1-7.
Welcome to Tagattitude, http://www.tagattitude.fr/, accessed on: May 16, 2011, pp. 1-4.
Chinese Office Action for related Chinese Patent Application No. 201180029071.9 dated Mar. 24, 2015, with English-language summary, 20 pages.

* cited by examiner

METHOD AND APPARATUS FOR PROVIDING AUTOMATED PAYMENT WITH AN AUDIO TOKEN

RELATED APPLICATIONS

This application claims the benefit of the earlier filing date under 35 U.S.C. §119(e) of U.S. Provisional Application Ser. No. 61/324,134 filed Apr. 14, 2010, entitled "Method and Apparatus for Providing Automated Payment," the entirety of which is incorporated herein by reference.

BACKGROUND

Service providers (e.g., wireless and cellular services) and device manufacturers are continually challenged to deliver value and convenience to consumers by, for example, providing compelling network services and advancing the underlying technologies. One area of interest has been the development of automated payments using, for instance, mobile devices or other user devices as alternative methods of payment. For example, instead of paying with cash, check, or credit cards, a consumer can use a mobile phone to pay for a wide range of services and digital or hard goods. It is noted, however, that many of these approaches to mobile payment systems often require additional hardware (e.g., near field communication (NFC) tags and readers) or network resources (e.g., cellular bandwidth) to operate. Accordingly, service providers and device manufacturers face significant technical challenges to enabling automated payments using existing user device and other equipment.

SOME EXAMPLE EMBODIMENTS

Therefore, there is a need for an approach for providing an efficient automated payment system over existing infrastructure and devices.

According to one embodiment, a method comprises receiving a request, at a device, for payment to a merchant, the request including a password. The method also comprises retrieving a personal identification number from a user of the device, an identifier associated with the user, a session code, or a combination thereof in response to the request. The method further comprises generating an audio token at the device based, at least in part, on the password, the personal identification number, the identifier associated with the user, the session code, or the combination thereof. The method further comprises causing, at least in part, conveyance of the audio token to the merchant to initiate the payment.

According to another embodiment, an apparatus comprising at least one processor, and at least one memory including computer program code for one or more computer programs, the at least one memory and the computer program code configured to, with the at least one processor, cause, at least in part, the apparatus to receive a request, at a device, for payment to a merchant, the request including a password. The apparatus is also caused to retrieve a personal identification number from a user of the device, an identifier associated with the user, a session code, or a combination thereof in response to the request. The apparatus is further caused to generate an audio token at the device based, at least in part, on the password, the personal identification number, the identifier associated with the user, the session code, or the combination thereof. The apparatus further causes, at least in part, conveyance of the audio token to the merchant to initiate the payment.

According to another embodiment, a computer-readable storage medium carrying one or more sequences of one or more instructions which, when executed by one or more processors, cause, at least in part, an apparatus to receive a request, at a device, for payment to a merchant, the request including a password. The apparatus is also caused to retrieve a personal identification number from a user of the device, an identifier associated with the user, a session code, or a combination thereof in response to the request. The apparatus is further caused to generate an audio token at the device based, at least in part, on the password, the personal identification number, the identifier associated with the user, the session code, or the combination thereof. The apparatus further causes, at least in part, conveyance of the audio token to the merchant to initiate the payment.

According to another embodiment, an apparatus comprises means for receiving a request, at a device, for payment to a merchant, the request including a password. The apparatus also comprises means for retrieving a personal identification number from a user of the device, an identifier associated with the user, a session code, or a combination thereof in response to the request. The apparatus further comprises means for generating an audio token at the device based, at least in part, on the password, the personal identification number, the identifier associated with the user, the session code, or the combination thereof. The apparatus further comprises means for causing, at least in part, conveyance of the audio token to the merchant to initiate the payment.

According to another embodiment, a method comprises receiving an audio token, from a device, in response to a request for payment. The method also comprises decoding the content of the audio token, the content including at least in part, a password associated with the request, a personal identification number of a user of the device, an identifier associated with the user, a session code, or a combination thereof. The method further comprises generating a payment authorization request based, at least in part, on the content, a merchant identifier, a point-of-sale identifier, a payment amount, or a combination thereof. The method further comprises causing, at least in part, transmission of the payment authorization request to an authorization device to validate the payment. The method further comprises receiving a confirmation message, from the authorization device, regarding the payment in response to the transmission.

According to another embodiment, an apparatus comprising at least one processor, and at least one memory including computer program code for one or more computer programs, the at least one memory and the computer program code configured to, with the at least one processor, cause, at least in part, the apparatus to receive an audio token, from a device, in response to a request for payment. The apparatus is also caused to decode the content of the audio token, the content including at least in part, a password associated with the request, a personal identification number of a user of the device, an identifier associated with the user, a session code, or a combination thereof. The apparatus is further caused to generate a payment authorization request based, at least in part, on the content, a merchant identifier, a point-of-sale identifier, a payment amount, or a combination thereof. The apparatus further causes at least in part, transmission of the payment authorization request to an authorization device to validate the payment. The apparatus is further caused to receive a confirmation message, from the authorization device, regarding the payment in response to the transmission.

According to another embodiment, a computer-readable storage medium carrying one or more sequences of one or more instructions which, when executed by one or more processors, cause, at least in part, an apparatus to receive an audio token, from a device, in response to a request for payment. The apparatus is also caused to decode the content of the audio token, the content including at least in part, a password associated with the request, a personal identification number of a user of the device, an identifier associated with the user, a session code, or a combination thereof. The apparatus is further caused to generate a payment authorization request based, at least in part, on the content, a merchant identifier, a point-of-sale identifier, a payment amount, or a combination thereof. The apparatus further causes at least in part, transmission of the payment authorization request to an authorization device to validate the payment. The apparatus is further caused to receive a confirmation message, from the authorization device, regarding the payment in response to the transmission.

According to yet another embodiment, an apparatus comprises means for receiving an audio token, from a device, in response to a request for payment. The apparatus also comprises means for decoding the content of the audio token, the content including at least in part, a password associated with the request, a personal identification number of a user of the device, an identifier associated with the user, a session code, or a combination thereof. The apparatus further comprises means for generating a payment authorization request based, at least in part, on the content, a merchant identifier, a point-of-sale identifier, a payment amount, or a combination thereof. The apparatus further comprises means for causing, at least in part, transmission of the payment authorization request to an authorization device to validate the payment. The apparatus further comprises means for receiving a confirmation message, from the authorization device, regarding the payment in response to the transmission Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing automated payment using audio tokens are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
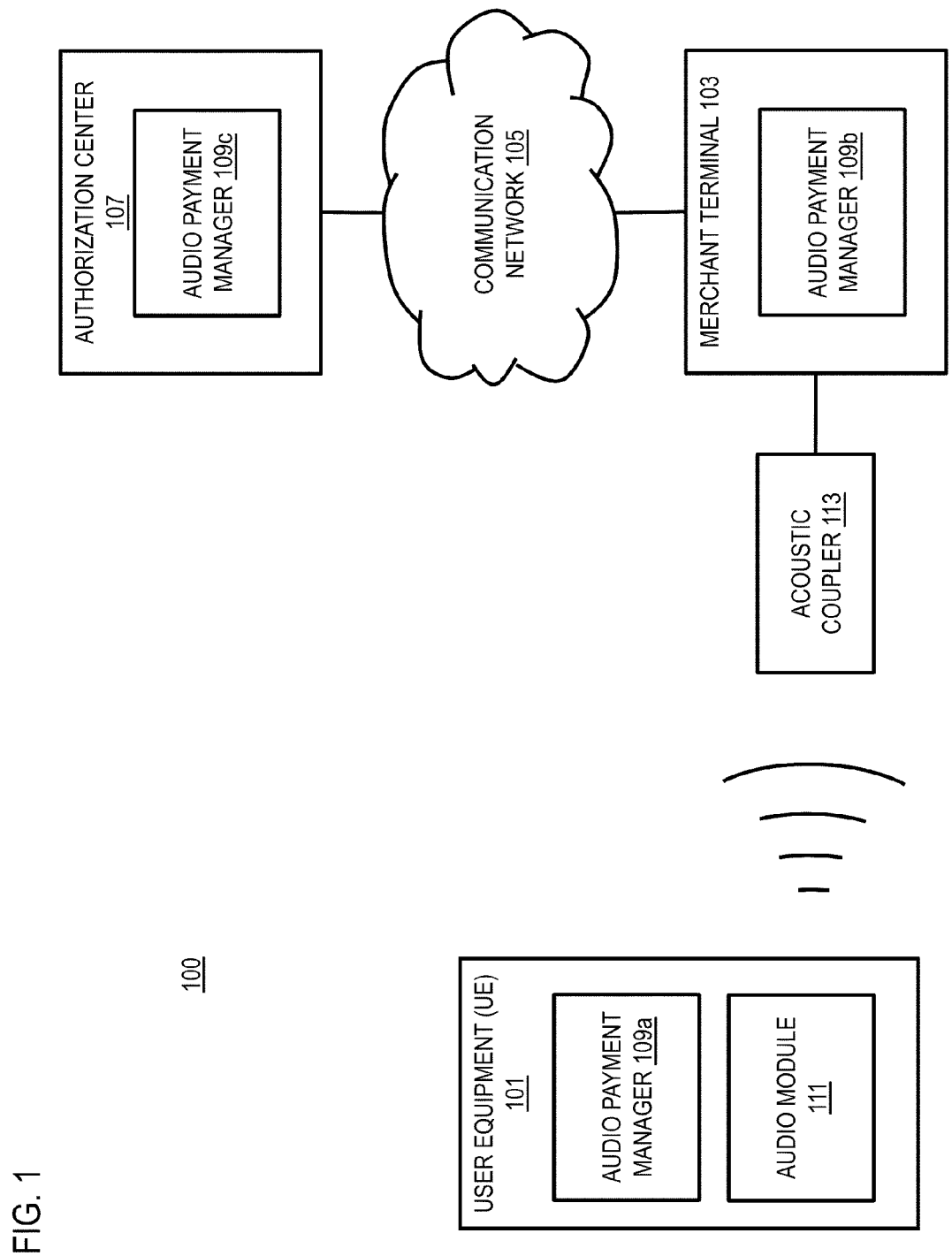
FIG. 1 is a diagram of a system capable of providing automated payment using audio tokens, according to one embodiment.

FIG. 1 is a diagram of a system capable of providing automated payment using audio tokens, according to one embodiment. As discussed previously, mobile payment via user devices are becoming increasingly popular. For example, near field communication (NFC) based mobile payment systems have been developed to facilitate payment by actuating an NFC tag equipped device (e.g., a cell phone) near a tag reader at a point of sale (POS) terminal. In this way, the POS terminal can read payment information from the tag and automatically conduct a transaction using the payment information. Accordingly, to complete a transaction, the user need only wave or tap a device equipped with an appropriate NFC tag to quick initiate a payment or otherwise conduct a transaction.

Although, the mobile payment via NFC tags offers great convenience, the technology requires additional hardware (e.g., NFC tags and readers) and related infrastructure to implement. It is noted that the vast majority of mobile devices (e.g., cell phones, smartphones, etc.) are not equipped with NFC tags and, therefore, users may not be able take advantage of automated or quick payments without purchasing new equipment. Some conventional approaches to solving this problem rely on encoding the payment information that would normally be stored in an NFC tag in a special audio clip or token. More specifically, to pay using a traditional audio token, a user initiates a voice call to a payment authorization service via the user's mobile device. Typically, the call is made to an interactive voice response (IVR) system of the authorization service to request an audio token that can be played during the call through the earpiece of the user's handset to convey the audio token to a merchant's terminal to initiate payment.

This traditional approach, however, generally requires a voice call to be made for each transaction, which can potentially add cost burdens to the user and discourage use of such a service. Moreover, if there is no network reception at the place of the transaction, the user may not be able to pay at all.

To address this problem, a system 100 of FIG. 1 introduces the capability to generate an audio token for payment without having to connect the user's device directly to a payment authorization center to obtain the token. More specifically, the system 100 generates the audio token locally at the user's device and plays (or otherwise conveys) the audio token to transfer the token to a merchant or POS terminal for processing, thereby advantageously avoiding the need to establish a voice or data connection to the authorization center. In other words, by not calling the authorization center for each transaction, the system 100 advantageously reduces the use of potentially expensive call time allotments and associated network resources (e.g., network bandwidth, processing time, device battery life, etc.). Therefore, means for generating audio token at the device is anticipated. In contrast and as described above, in a traditional audio token payment system, the audio token is generated and played by the authorization center rather than the user device.

As shown in FIG. 1, the system 100 comprises a user equipment (UE) 101 that can interact with a merchant terminal 103 (e.g., a POS terminal or device). The UE 101 and the merchant terminal 103 also have connectivity via a communication network 105 to an authorization center 107. In one embodiment, the UE 101, the merchant terminal 103, and the authorization center 107 include respective audio payment managers 109a-109c. By way of example, the audio payment manager 109a in the UE 101 is a customer payment application executing on the customer's device, the audio payment manager 109b in the merchant terminal 103 is merchant application executing on a POS terminal or device, and the audio payment manager 109c operates on the authorization center 107.

In one embodiment, the audio payment manager 109c of the authorization center 107 is responsible for: (1) authenticating audio tokens and participating devices; (2) authorizing payment based, at least in part, on the authentication; (3) conducting settlement procedures following the authorization of payment; (4) initializing the audio token payment services at the UE 101 and/or the merchant terminal 103; and the like.

In the example of FIG. 1, the UE 101 further includes an audio module 111 for playing back the audio tokens. In one embodiment, the audio module 111 comprises a speaker with a digital to analog converter to translate the audio token into audio signals for conveying to the merchant terminal 103 via an acoustic coupler 113. By way of example, the acoustic coupler 113 is an interface for conveying the audio token from the UE 101 to the merchant terminal 103. More specifically, the acoustic coupler 113 includes, for instance, a microphone with a physical receptacle for the UE 101 so that audio signals played by the UE 101 over a speaker, earpiece, or other audio output device can be captured and parsed by the merchant terminal 103 for processing.

In one embodiment, the authorization center 107 and/or the audio payment manager 109c of the authorization center 107 initiates an audio token payment service by generating a set of passwords, such as one-time use passwords (OTPs), and transmitting them to the audio payment manager 109a of the UE 101. The initialization process can occur, for example, at any time prior to beginning payment transactions. In certain embodiments, the initialization process is performed only once when the payment service is activated on the UE 101. In one embodiment, the OTPs may be associated with index numbers that can be used to identify the OTPs without exposing the OTP itself. In some embodiments, the audio payment manager 109b may also receive a copy of the passwords or an index of the passwords for reference in future transactions.

In the approach described herein, the OTPs are used as part of a secret key for generating a unique audio token at the UE 101 to initiate secure payment. For example, the audio payment manager 109a of the UE 101 receives a request for payment wherein the request includes a password or an index of the password depending on a desired level of security. The UE 101 combines the password with unique identifiers such as a personal identification number (PIN), a user identifier (user ID), and/or identifiers associated with the transaction (e.g., session identifiers, payment amount, etc.) for generating an audio token. The audio token can be used for payments between the UE 101 and the merchant terminal 103.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), audio/video player, digital camera/camcorder, positioning device, television receiver, radio broadcast receiver, electronic book device, game device, or any combination thereof. It is also contemplated that the UE 101 can support any type of interface to the user (such as "wearable" circuitry, etc.).

By way of example, the UE 101, the merchant terminal 103, and the authorization center 107 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the audio payment managers 109a-109c interact with each other according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
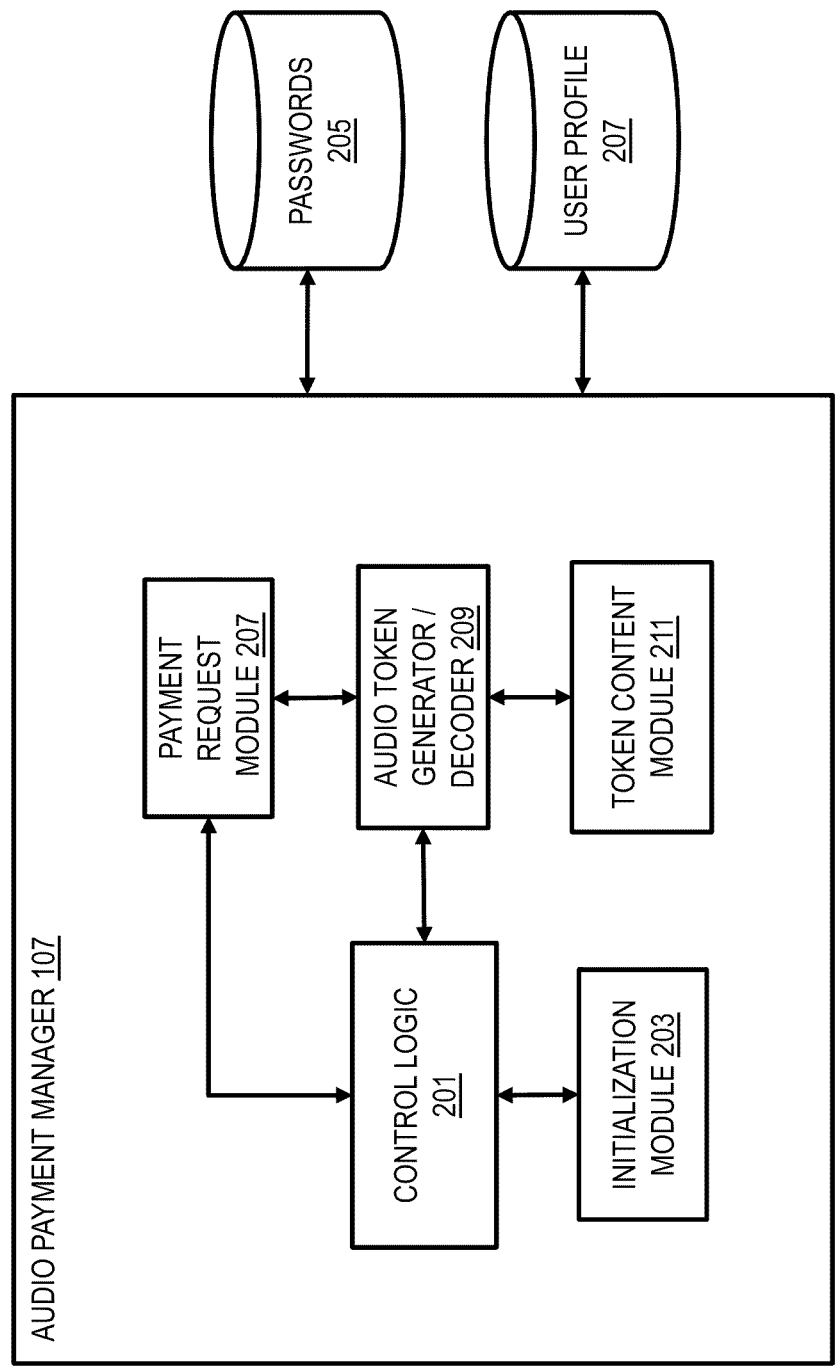
FIG. 2 is a diagram of the components of an audio payment manager, according to one embodiment.

FIG. 2 is a diagram of the components of an audio payment manager, according to one embodiment. By way of example, the audio payment manager 109 includes one or more components for providing automated payment via audio tokens. It is contemplated that the functions of these components may be combined in one or more components or performed by other components of equivalent functionality. In one embodiment, the audio payment manager 109 includes a control logic 201 which executes at least one algorithm for executing functions of the audio payment manager 109. For example, the control logic 201 interacts with an initialization module 203 to initialize an audio token payment service at a UE 101. As noted previously, initialization at the UE 101 includes receiving a set of OTP generated by the authorization center 107.

In one embodiment, an OTP is a password that is valid for a single use (e.g., a single transaction or payment). By using OTPs, the audio payment manager 109 increases security by reducing susceptibility to replay attacks whereby and attacker records the OTP or password and attempts to use it to conduct a transaction. However, because the OTP can only be used once, the OTP is not likely to be valid for an extended period of time. For example, in one risk scenario, a fraudulent merchant has a fake or modified merchant terminal 103. A valid UE 101 attempts to pay using the audio-based payment approach described herein. The fake merchant terminal 103 records the audio token and displays an error message that the transaction was canceled (e.g., due to a connection error between the terminal 103 and the authorization center 107). The merchant sends the recorded audio token to the phone of an accomplice and the accomplice now tries to make a payment by playing the recorded audio token at an authentic merchant terminal 103. In certain embodiments, the uses session codes, tokens, and/or nonces (e.g., a string that is intended to be used only once) to avoid the replay attack described above. Moreover, in other embodiments, the OTP can be associated with one or more criteria or context for specifying validity (e.g., a validity time, location, transaction type, etc.) to further reduce susceptibility to attack.

In yet other embodiments, PIN codes or other similar codes can be used to further enhance security by restricting access to the audio payment manager 109. For example, if someone borrows or steals a UE 101 equipped with the audio payment manager 109, it would not be possible to use the manager 109 to make a payment without the PIN code. In another embodiment, the PIN code may be combined with the OTP so that if a hacker reads an OTP from the UE 101, the hacker would nonetheless be unable to create a valid audio token for payment without the PIN code to the manager 109.

In one example, a predetermined number of OTPs are generated during service initialization and transmitted to the UE 101 for storage in, for instance, a database 205 of passwords. The specific number of predetermined OTPs to store can be determined based on, for instance, an expected number of transactions, a desired level of security, or the like. For example, if the UE 101 is expected to be involved in a large number of transactions, the number of predetermined OTPs can be increased. Similarly, a higher level of security is desired a larger number of OTPs may be generated so that it would be more difficult to guess or predict which predetermined OTP is to be used for any particular transaction. In one embodiment, the initialization module 203 receives the predetermined OTPs via secure (encrypted) text message (e.g., a short messaging service (SMS) message).

By way of example, the OTPs may be generated using one or more algorithms based, at least in part, on randomness. In addition or alternatively, the algorithms may be based on any one or more of: (1) time-synchronization between the authorization center 107 and the UE 101 so that the OTPs are valid only for a short period of time; (2) chaining of OTPs so that a mathematical algorithm generates a new OTP based on the previous OTP; (3) a challenge such as a transaction or session code or counter; and the like.

In another embodiment, the initialization module 203 also creates a user profile for storage in the database 207 of user profiles. This user profile may identify preferences and configuration associated with a particular user of the UE 101 including security settings, payment information, etc. For example, the user profile may record a personal identification number (PIN) code associated with the user, a user identification number to identity the user in the payment service, and the like. In some embodiments, the user profile information can then be used as part of the audio token generation process.

Following initialization of the payment service, the control logic 201 interacts with the payment request module 207 to either generate or receive a payment request based on whether the audio payment manager is executing on the UE 101, the merchant terminal 103, or the authorization center 107. For example, if executing on the UE 101, the payment request module 207 receives a payment request, wherein the request includes a password (e.g., an OTP) or an index to a password that was previously stored at the device. If executing on the merchant terminal 103, the payment request module 207 generates a payment request depending on, for example, what transaction is being conducted between the UE 101 and the merchant terminal 103. Finally, if executing on the authorization center 107, the payment request module 207 may be used to validate and confirm payment information specified in an audio token. These processes are described in further detail with respect to the processes of FIGS. 3-8 below.

Next, the control logic 201 interacts with the audio token generator/decoder 209 to either generate a new audio token or process an audio token that has been presented for payment. In either case, the token generator/decoder 209 can interact with the token content module 211 to retrieve and/or request additional information such as the PIN code, user ID, session number, transaction details (e.g., payment amount, time, location, etc.) to generate or decode the audio token. More specifically, the token generator/decoder 209 can use one or more cryptographic algorithms (e.g., SHA-0, SHA-1, SHA-2, and similar cryptographic hash functions).

In some embodiments, the token generator/decoder 209 may also generate or process a message authentication code (MAC) associated with the audio token. By way of example, the MAC is short piece of information that can be used to authenticate the audio token for additional security. More specifically, the MAC is generated according to an algorithm such as a keyed cryptographic hash function (e.g., a hash-based MAC (HMAC) that accepts a secret key and the message or information to be authenticated. The MAC, for instance, protects both the data integrity and authenticity of the audio token by enabling the validating entity (e.g., the authorization center 107 and/or the merchant terminal 103) to detect any changes to the audio token. In one embodiment, the token generator/decoder 209 uses a combination of a selected OTP and the user's PIN code as the secret key. The message or information to be authenticated (e.g., the content of the audio token) can include the user ID, session code, transaction details, etc.

Figure 3:
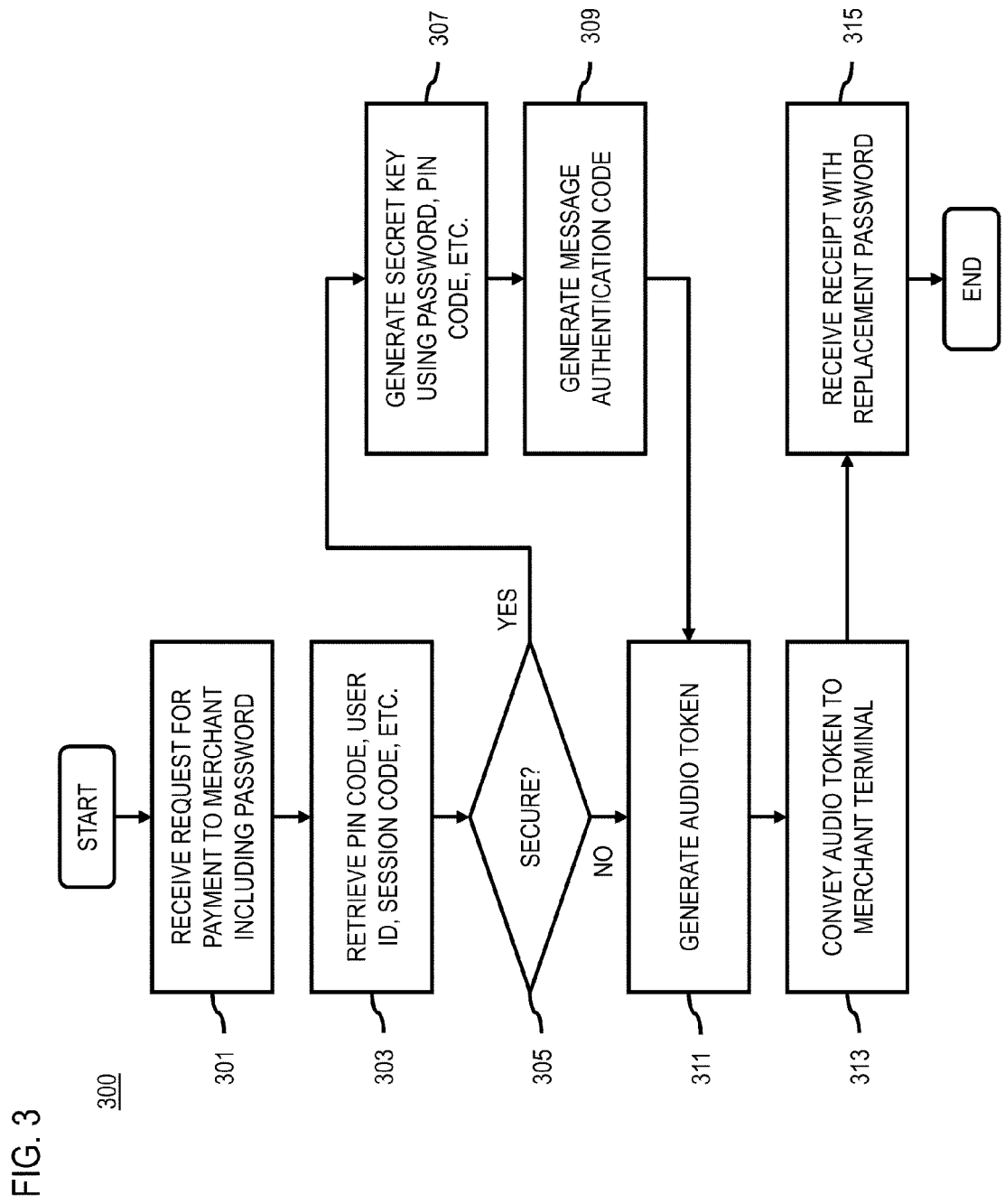
FIG. 3 is a flowchart of a process for generating an audio token for a payment transaction, according to one embodiment.
Figure 11:
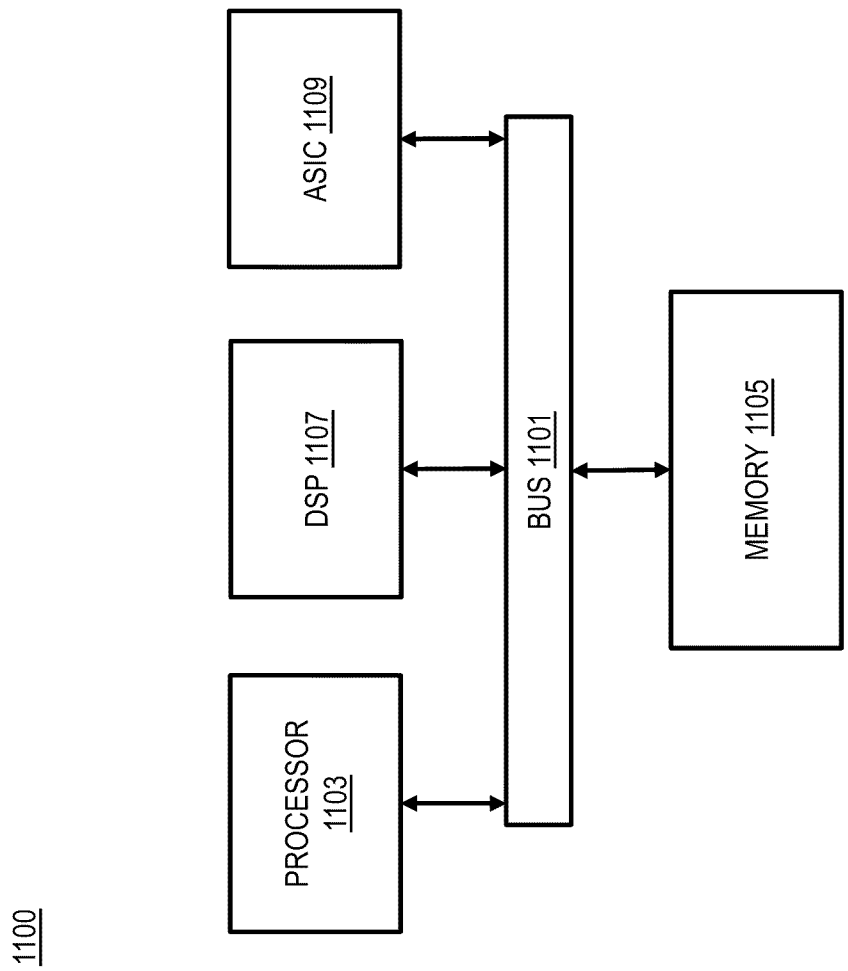
FIG. 11 is a diagram of a chip set that can be used to implement an embodiment of the invention.

FIG. 3 is a flowchart of a process for generating an audio token for a payment transaction, according to one embodiment. In one embodiment, the audio payment manager 109a of the UE 101 performs the process 300 and is implemented in, for instance, a chip set including a processor and a memory as shown in FIG. 11. In addition or alternatively, it is contemplated that all or a portion of the process 300 may be performed by audio payment managers 109b and/or 109c. In step 301, the audio payment manager 109a receives a request, at the UE 101, for payment to a merchant terminal 103. This request, for instance, is received as part of a transaction being conducted between the UE 101 and the merchant terminal 103. In one embodiment, the request includes or specifies at least one the OTPs previously generated by the authorization center 107. This password will assist in generating a secure audio token that can be authenticated so that payment can be initiated. In certain embodiments, the password is not exposed to the merchant terminal 103. In these cases, the request may specify an index number associated with one of the previously stored OTPs rather than the OTP itself. In one embodiment, the index number included in the request can be selected at random.

Next, in step 303, the audio payment manager 109a retrieves the password (e.g., if only an index is specified), a PIN code associated with the user, a user ID of the user, a session code, transaction details, etc. For example, the PIN code may be requested on launching or accessing the audio payment manager 109a. The exact information to be retrieved can be configured based, at least in part, on a security level setting of the audio payment manager 109a, a desired user experience, or similar factors. For example, in some cases, manually entering a PIN code and session code to initiate a payment or access the audio payment manager 109a can be cumbersome. More specifically, requiring entry of both a PIN code and session code can be slower than requiring entry of only the PIN code. Requiring the session code may also require that the user obtain the session code from the merchant terminal 103. However, in many cases the user may need to look at the merchant terminal 103 anyway, for instance, to check the price of the transaction or obtain other transaction details, so there may not be a significant degradation of the user experience by requiring entry of both the PIN code and session code.

Accordingly, as shown in step 305, it is contemplated that the audio payment manager 109a may balance security risks against user experience to determine what information is retrieved and/or manually requested from the user. In one embodiment, the determination can be made automatically by the audio payment manager 109a according to predetermined risk criteria or parameters. For example, a session code can be requested if a transaction amount, frequency, etc. is exceeded. In this case, the session code can be used to ensure that a generated audio token can only be used during the specified transaction or session, thereby advantageously reducing the chances of a successful replay attack. It is contemplated that any criteria may be applied to determine a security mode for operating the audio payment manager 109a.

If a more secure mode is selected or determined, the audio payment manager 109a can employ a variety of cryptographic functions such as deriving a secret key from, for instance, the selected OTP and PIN code (step 307). In other embodiments, the secret key may be created from any combination of information obtained from the UE 101, the merchant terminal 103, and/or the authorization center 107.

As an additional layer of security, the audio payment manager 109a generates a message authentication code (MAC) based, at least in part, on a cryptographic hash algorithm (e.g., HMAC) applied on the user ID, session code, OTP, secret key, or a combination thereof (step 309). Although it is contemplated that the MAC can be of any size or length, in one embodiment, the MAC ranges from 16-64 bits in length. Next, in step 311, the audio payment manager 109a generates the audio token based on the user ID, session code, OTP, PIN code, MAC, or a combination thereof. By way of example, generating an audio token includes encoding the content selected for inclusion in the token in an audio file wherein the sounds represent information (e.g., the binary content of the information) similar to the process employed for transmission of faxes or analog modems. The MAC associated with the audio token can then be used by subsequent entities to validate the authenticity and/or integrity of the audio token.

The audio payment manager 109a then conveys the audio token to the merchant terminal 103 (step 313). In one embodiment, conveying the audio token includes playing back the audio token in an acoustic coupler 113 of the merchant terminal 103. The merchant terminal 103 then uses its network connection to validate the audio token with the authorization center 107. In this way, the UE 101 and/or the audio payment manager 109a need not use a network connection specific to the UE 101 as part of the payment process. In response, if the payment is successful, the audio payment manager 109a receives a receipt of the transaction from either the authorization center 107 or the merchant terminal 103 (step 315). The receipt may be provided via secure SMS and may also include a replacement OTP for the OTP that was used in the transaction. In this way, the audio payment manager 109a can ensure that it has the enough OTPs to support other transactions.

Figure 4:
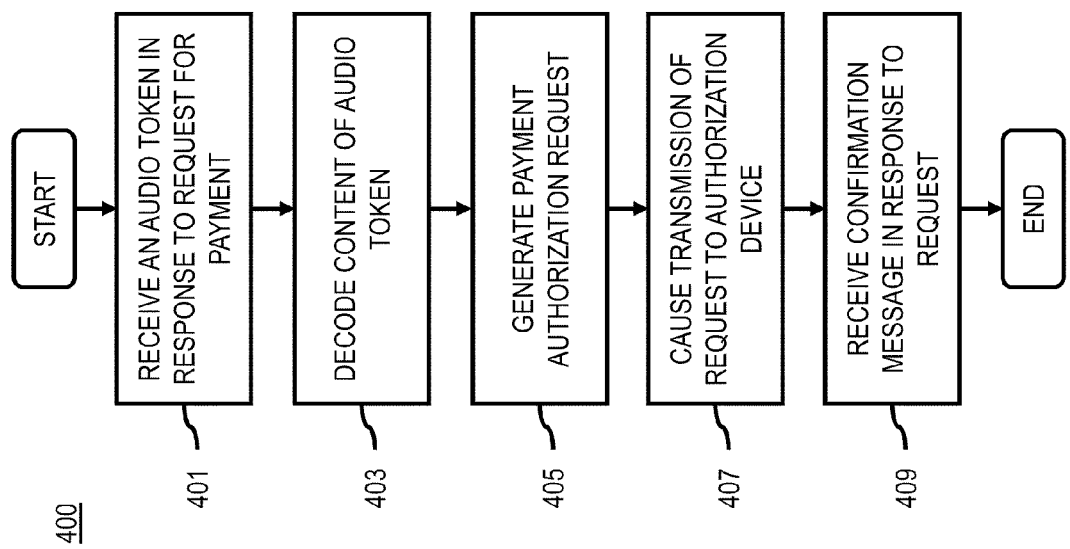
FIG. 4 is a flowchart of a process for receiving an audio token for a payment transaction, according to one embodiment.

FIG. 4 is a flowchart of a process for receiving an audio token for a payment transaction, according to one embodiment. In one embodiment, the audio payment manager 109b of the merchant terminal 103 performs the process 400 and is implemented in, for instance, a chip set including a processor and a memory as shown in FIG. 11. In addition or alternatively, it is contemplated that all or a portion of the process 400 may be performed by audio payment managers 109b and/or 109c. In step 401, the audio payment manager 109b receives an audio token from the UE 101 in response to a payment request. By way of example, the audio token can be generated according to the process 300 as described with respect to FIG. 3. Next, the audio payment manager 109b decodes the content of the audio token (step 403). For example, the content may include at least in part an OTP associated with the request, a PIN code associated with the user, a user ID, transaction details, or a combination thereof. The decoding process includes converting the audio signals of the token to information files that can be transmitted to the authorization center 107 over the communication network 105.

In some embodiments, the audio token may include or be associated with a MAC for authentication. If the audio payment manager 109b has access to the secret key (e.g., the OTP and PIN combination) used to generate the MAC, the manager 109b may authenticate the audio token during the decoding process. If the OTP is not available (e.g., when the merchant terminal 101 has access to only the index number associated with the OTP rather than the OTP itself), then the audio payment manager 109b can pass the MAC along with the contents of the audio token to the authorization server 107.

In step 405, the audio payment manager 109b generates a payment authorization request based at least in part on the audio token, the content of the audio token, a merchant identifier, a point-of-sale identifier, a payment amount, other transaction details, or a combination thereof. For example, identification of the merchant and POS terminal enables the audio payment manager 109b to provide reports of transactions to the merchant as well has ensure that any payments are properly authorized and credited to the merchant. The audio payment manager 109a then causes, at least in part, transmission of the payment authorization request to the authorization center 107 (or other authorization device) to validate and complete the payment (step 407). On completion of the validation, the audio payment manager 109b receives a confirmation message indicating either that payment was made or rejected from the authorization center 107 (step 409). Based on this confirmation, the audio payment manager 109b can direct the merchant terminal 103 or the merchant to complete or void the transaction.

Figure 5:
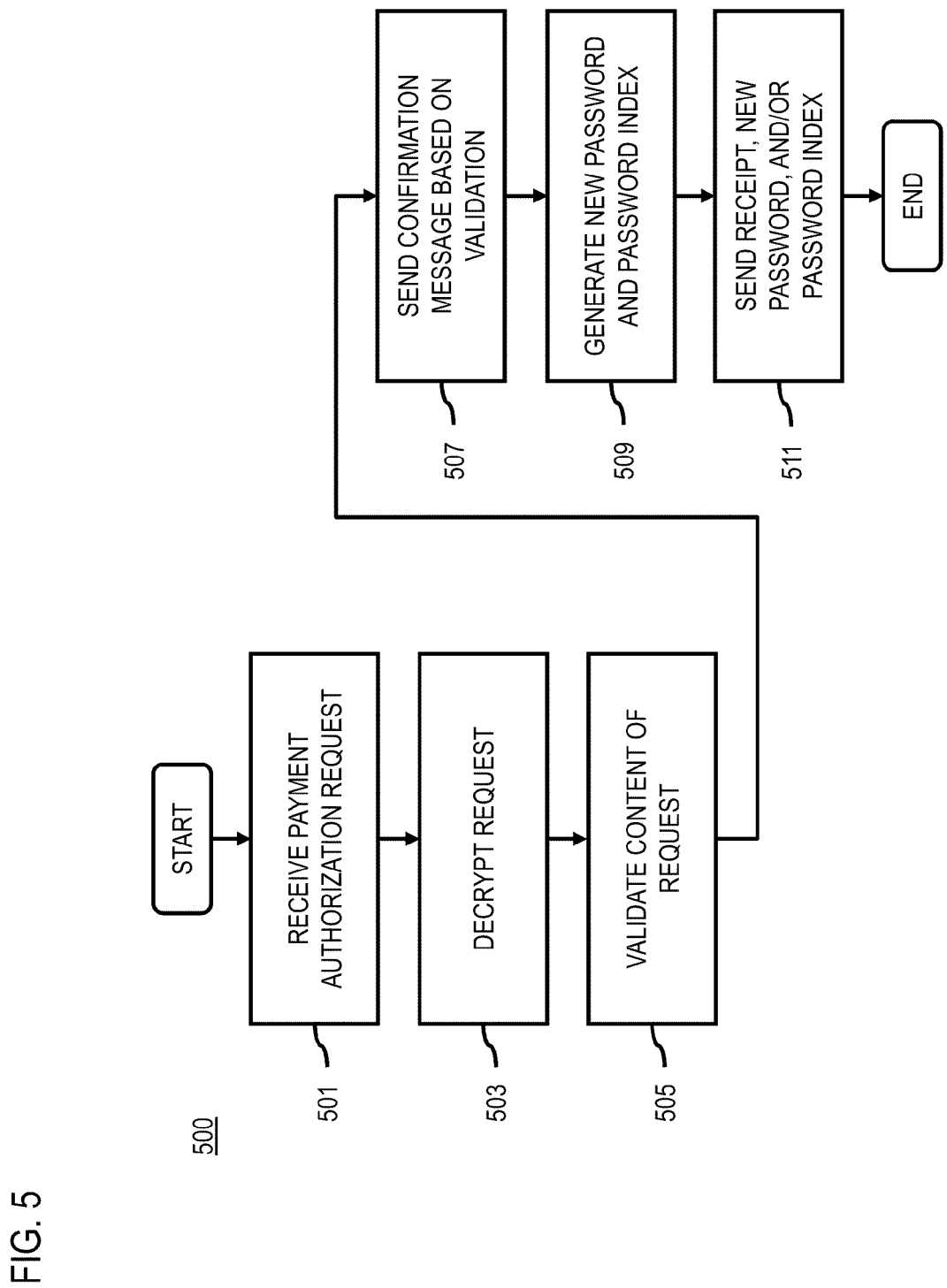
FIG. 5 is a flowchart of a process for validating an audio token for a payment transaction, according to one embodiment.

FIG. 5 is a flowchart of a process for validating an audio token for a payment transaction, according to one embodiment. In one embodiment, the audio payment manager 109c of the authorization center 107 performs the process 500 and is implemented in, for instance, a chip set including a processor and a memory as shown in FIG. 11. In addition or alternatively, it is contemplated that all or a portion of the process 500 may be performed by audio payment managers 109a and/or 109b. In step 501, the audio payment manager 109c receives a payment authorization request from the merchant terminal 103. In this example, the payment authorization request is generated according to the process 400 of FIG. 4 and includes the audio token, associated MAC, merchant identifier, POS identifier, payment amount, transaction details, or combination thereof.

In step 503, the audio payment manager 109c decrypts the request including the audio token based on the selected OTP. To decrypt the request and/or the audio token, the audio payment manager 109c retrieves the selected OTP from the predetermined list associated with the corresponding UE 101. In some embodiments, the request specifies an index associated with the OTP rather the OTP itself to avoid potential exposure of the OTP. In this case, the audio payment manager 109c has access to the same index as the UE 101 and can, therefore, identify the correct OTP based on the index number. The audio payment manager 109c reconstructs the secret key from the OTP and user PIN code for decryption of the request.

Once decrypted, the audio payment manager 109c validates the information (e.g., payment information, transaction details, etc.) provided in the request and completes payment as requested based on the validation (step 505). For example, the audio payment manager 109c can validate the authenticity of the request using the MAC associated with the audio token. In addition, validation may include verifying the account of the requesting user to ensure that there are sufficient funds and/or that the transaction meets any predetermined policy or criteria. Based on this validation, the audio payment manager 109c sends a confirmation message to the merchant terminal 103 to indicate whether the payment request is to be paid or not (step 507). If the payment is successful, the audio payment manager 109c generates a new OTP and accompanying index (step 509). The new OTP and index is then sent to the UE 101 along with a receipt of the transaction (step 511).

Figure 6:
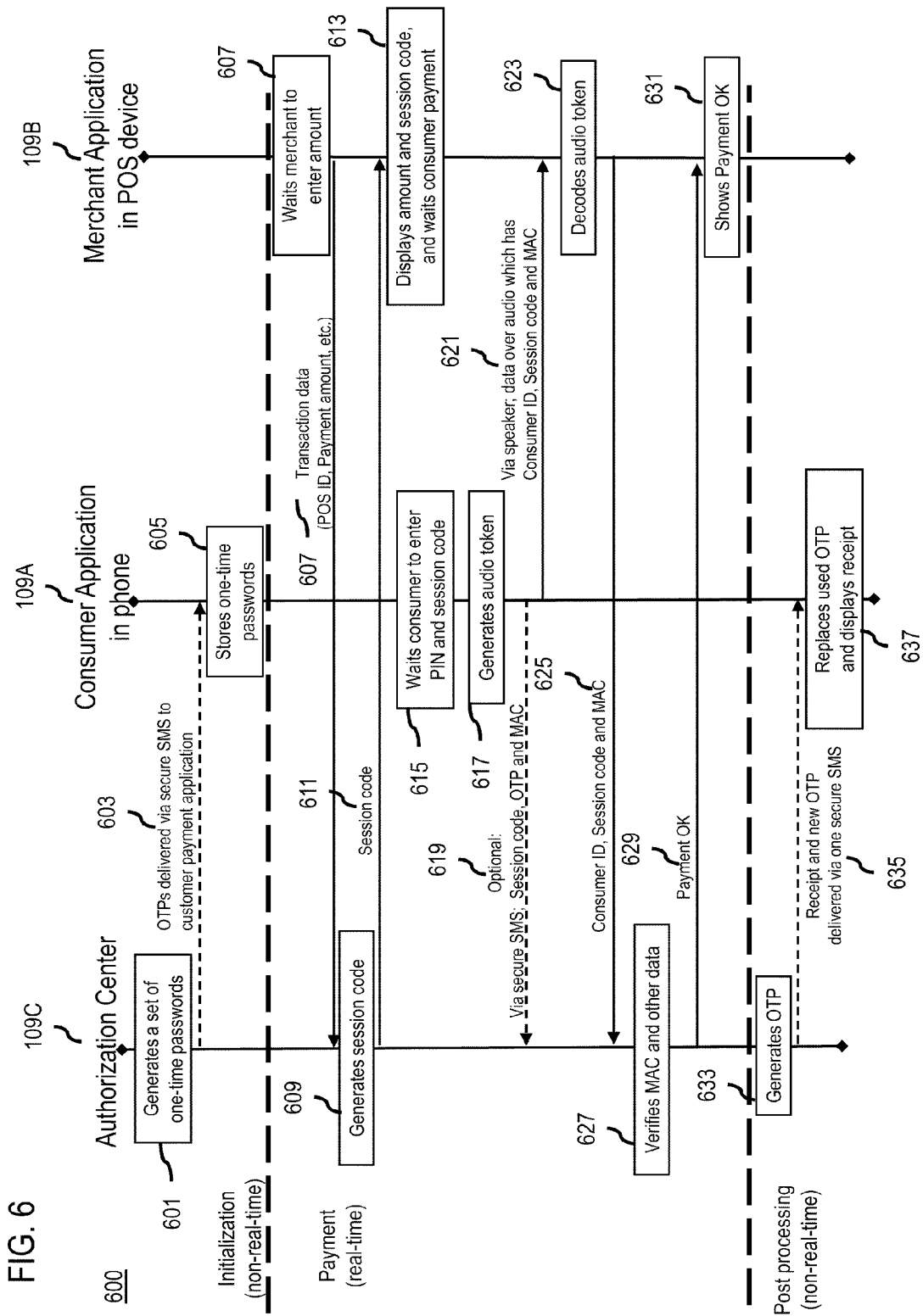
FIG. 6 is a time sequence diagram that illustrates a sequence of messages and processes for automated payment using audio tokens over a data connection, according to one embodiment.

FIG. 6 is a time sequence diagram that illustrates a sequence of messages and processes for automated payment using audio tokens over a data connection, according to one embodiment. A network process is represented by a box and a message passed from one process to another is represented by horizontal arrows. A step performed by a process is indicated by the text. The processes represented in FIG. 6 are an audio payment manager 109c of the authorization center 107 (referred to in FIG. 6 as authorization center 109c), an audio payment manager 109a of the UE 101 (referred to in FIG. 6 as a consumer application 109a in phone), and an audio payment manager 109b of the merchant terminal 103 (referred to in FIG. 6 as a merchant application 109B in POS device).

For the process 600 of FIG. 6, it is assumed that the data connection between the merchant application 109b and the authorization center 109c is a persistent data connection (e.g., GPRS connection) where data usage is metered according to amount transferred rather than time. Accordingly, the process 600 is not time critical. As shown, processes and steps 603-605 represent the initialization phase of the audio token payment process. At 601, the authorization center 109c generates a set of OTPs as described above. The OTPs are delivered to the consumer application 109b via a secure SMS message. On receipt of the OTPs, the consumer application 109a stores the OTPs for subsequent use. In some embodiments, the OTPs are associated with and index which can also be determined by the authorization center 109c or determined locally accordingly to a common algorithm across the process 109a-109c. By way of example, the common algorithm enables the processes to define same index numbers for identical sets of OTPs.

To begin the payment phase of the process 600, the merchant application 109*b* waits for the merchant to enter a transaction amount and optionally other transaction details as item, number, total, etc. (at 607). The merchant application 109*b* then derives transaction data from based on the input and transmit the data authorization center 109*c* to obtain a session code. As discussed previously, the session code enables the system 100 to tie the transaction and resulting audio token to the specified transaction to prevent possible replay attacks. Based on the transaction data, the authorization center generates a session code (step 609) and transmits the code to the merchant code over the data connection (step 611). In response, the merchant application 109*b* displays the transaction amount and the session code and waits for the consumer application to initiate payment (step 613).

At 615, the consumer application 109*a* is launched and waits for the consumer to enter a PIN code and the session code. In embodiment, the consumer can obtain the session code from the merchant application 109*b* display. On entry of the PIN code and session code, the consumer application generates an audio token, accompanying MAC, and other related information for payment of the specified transaction (step 617). Following generation of the code, the consumer application may optionally transmit the session code, OTP, and MAC to the authorization center 109*c* (step 619). The authorization center 109*c* may use this optional information during the audio token verification step 627 described below to ensure that the audio token is used only for the specified transaction.

After generating the audio token, the consumer application 109*a*, via a speaker of the UE 101 on which it is executing, plays the audio token to the merchant application 109*b* (step 621). The audio token contains, for instance, the consumer ID, session code, MAC, etc. The merchant application 109*b* decodes the audio token (step 623) and transmits the decoded information to the authorization center 109*c*. The authorization center 109C verifies the MAC and the session code to authenticate the audio token and the data derived there from. Following validation and confirmation, the authorization center 109*c* transmits a message 629 to the merchant application 109*b* that the payment is OK. The merchant application 109*b* displays the confirmation message as confirmation of the payment (step 631).

In the post processing phase of the process 600, the authorization center 109*c* generates a new OTP to replace the OTP used during the transaction (step 633). As described previously, the new OTP is transmitted with a receipt of the transaction to the consumer application 109*a* (step 637).

Figure 7:
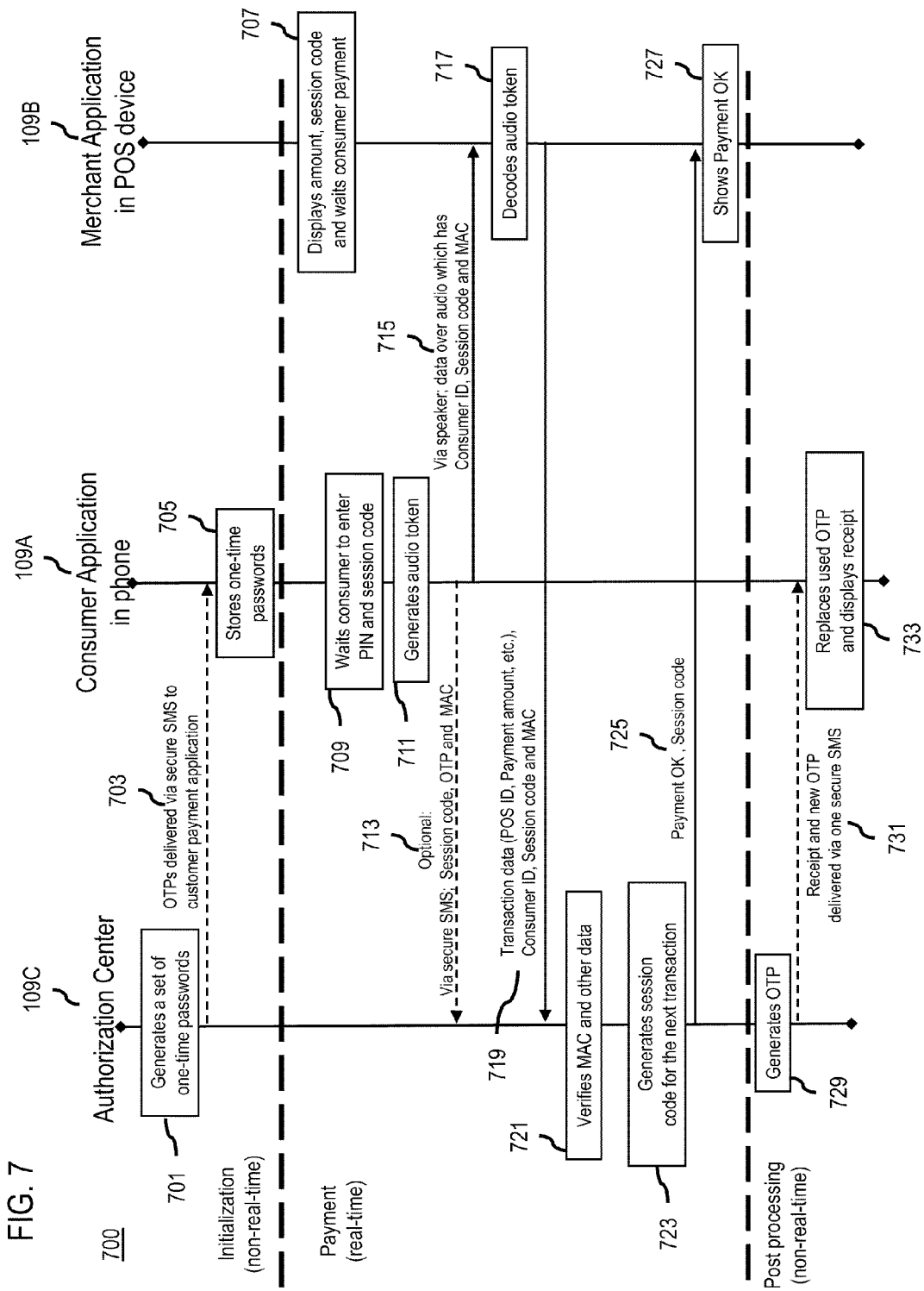
FIG. 7 is a time sequence diagram that illustrates a sequence of messages and processes for automated payment using audio tokes over a data over voice call connection, according to one embodiment.

FIG. 7 is a time sequence diagram that illustrates a sequence of messages and processes for automated payment using audio tokes over a data over voice call connection, according to one embodiment. A network process is represented by a box and a message passed from one process to another is represented by horizontal arrows. A step performed by a process is indicated by the text. The processes represented in FIG. 7 are an audio payment manager 109*c* of the authorization center 107 (referred to in FIG. 7 as authorization center 109*c*), an audio payment manager 109*a* of the UE 101 (referred to in FIG. 7 as a consumer application 109*a* in phone), and an audio payment manager 109*b* of the merchant terminal 103 (referred to in FIG. 7 as a merchant application 109B in POS device).

For the process 700 of FIG. 7, it is assumed that the connection between the merchant application 109*b* and the authorization center 109*c* is a data over voice call connection where usage is time basis (e.g., per minute). Accordingly, the process 700 illustrates an embodiment of the payment process that minimizes the time that the merchant application 109*b* has to maintain connectivity to the authorization center 109*c*. As shown, processes and steps 703-705 represent the initialization phase of the audio token payment process and are analogous to the processes and steps 603-605 of FIG. 6.

At step 707, the merchant application displays a previously generated session code for the transaction without assistance and/or connection to the authorization center 109*c* to advantageously reduce connection time over the data over voice connection. In one embodiment, the session code is generated by the authorization center 109*c* and transmitted to the merchant application 109*b* during a previous communication session (e.g., the previous time the merchant application conducted a transaction). Steps 709-717 are analogous to the steps 615-623 of FIG. 6 and can share the same description. As shown in the process 700, following decoding of the audio token (at step 717), the merchant application 109*b* establishes its first connection to the authorization center 109*c* over the data over voice connection (step 719). As with the process 600, the authorization center 109*c* verifies the transaction data and audio token content including the session code (step 721). In addition, the authorization center 109*c* generates a session code for the next transaction (step 723). The authorization center then transmits the payment confirmation and the session code for the next transaction in the same communication session (step 725). In this way, the merchant application 109*b* and the authorization center 109*c* need not establish a separate session to transmit the session code, thereby reducing connection time and costs.

The remaining steps 727-733 are analogous to the steps 631-637 of FIG. 6 and share the description there from.

Figure 8:
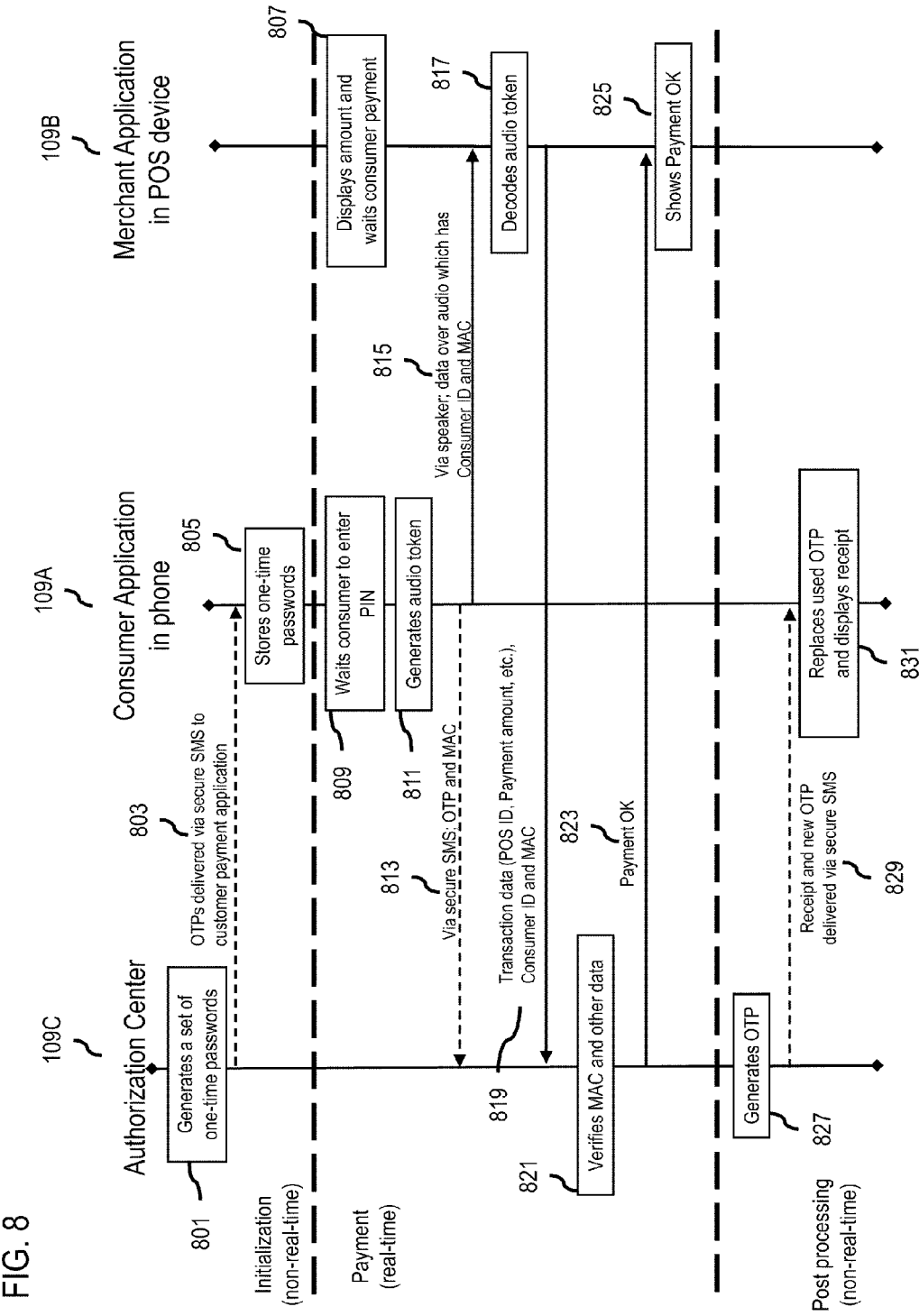
FIG. 8 is a time sequence diagram that illustrates a sequence of messages and processes for automated payment for a low value transaction, according to one embodiment.

FIG. 8 is a time sequence diagram that illustrates a sequence of messages and processes for automated payment for a low value transaction, according to one embodiment. A network process is represented by a box and a message passed from one process to another is represented by horizontal arrows. A step performed by a process is indicated by the text. The processes represented in FIG. 8 are an audio payment manager 109*c* of the authorization center 107 (referred to in FIG. 8 as authorization center 109*c*), an audio payment manager 109*a* of the UE 101 (referred to in FIG. 8 as a consumer application 109*a* in phone), and an audio payment manager 109*b* of the merchant terminal 103 (referred to in FIG. 8 as a merchant application 109B in POS device).

For the process 800 of FIG. 8, it is assumed that transaction involves a relatively low transaction value (e.g., a value below a predetermined threshold) and, therefore, the use of a session code for added security is not needed. Accordingly, the session code can be eliminated to avoid asking the consumer to manually enter the session code. As shown, processes and steps 803-805 represent the initialization phase of the audio token payment process and are analogous to the processes and steps 603-605 of FIG. 6 and the processes and steps 703-705 of FIG. 7.

However, unlike either of the processes 600 or 700, the merchant application 109*b* displays only the amount of the transaction and does not display or request a session code (step 807). Consequently, the consumer application requests only that the user enter a PIN code to initiate the payment process (step 809). Based on the PIN code and other retrieved information (as previously described), the consumer application 109*a* generates an audio token that does not include a session code (step 811). In other words, the payment process 800 has lower security because of value of the any potential loses illicit attacks is low.

The remaining steps 813-831 of the process 800 are analogous to the steps 617-637 and share the description there from with the exception that the process 800 includes no session code.

Figure 9A:
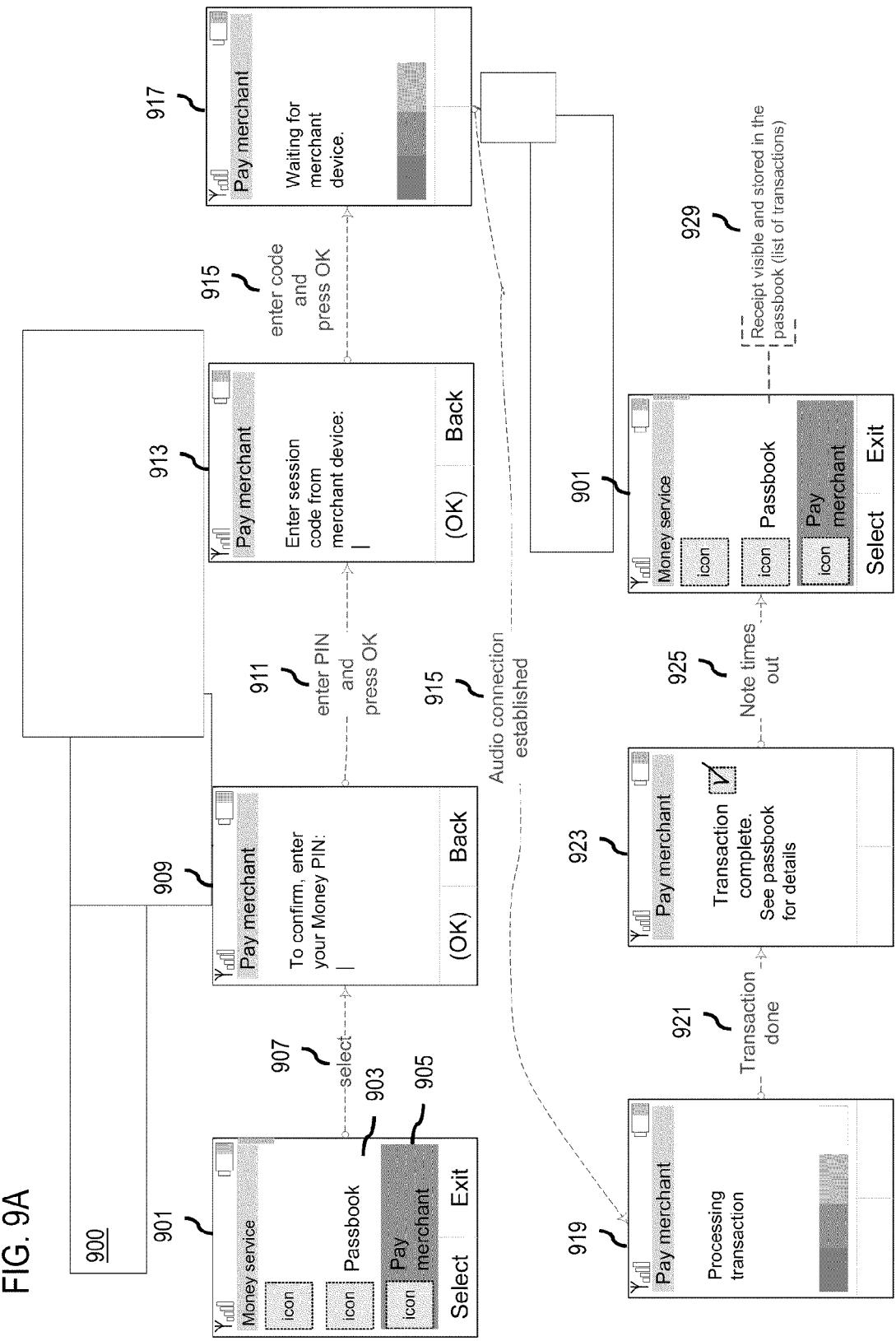
FIGS. 9A and 9B are diagrams of user interfaces utilized in the processes of FIGS. 3-5, according to various embodiments.
Figure 9B:
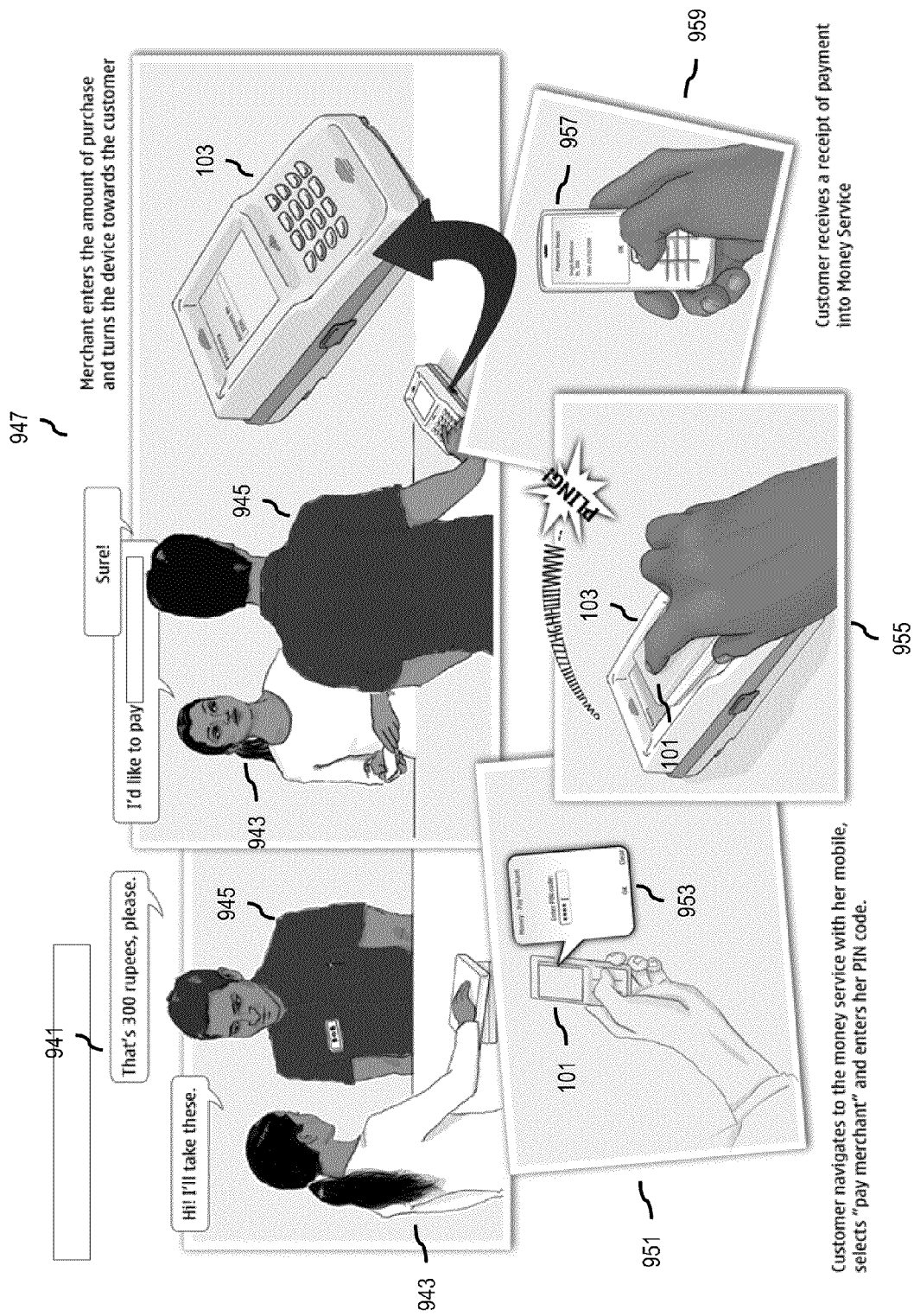

FIGS. 9A and 9B are diagrams of user interfaces utilized in the processes of FIGS. 3-5, according to various embodiments. FIG. 9A depicts a sequence of user interfaces for interacting with the audio payment manager 109a on a UE 101, according to one embodiment. On launch, the audio payment manager 109a presents a user interface 901 displaying options available in a "Money Service" that provides for payment using audio tokens. As shown, the user interface 901 includes two service options: an option 903 for displaying a passbook and an option 905 for paying a merchant using an audio token. In this example, the option 905 is selected to initiate payment to a merchant. This selection results in presentation of a user interface 909 for inputting a PIN code for accessing the payment service. In one embodiment, the PIN code can be masked to prevent inadvertent exposure.

On entry of the user's PIN code, the audio payment manager 109a may display a user interface 913 for entering a session code. In one embodiment, the session code is provided by the merchant to ensure that the audio token generated during this process is specific to the intended transaction. As with the PIN code, the session code can also be masked to prevent exposure. In addition, it is contemplated that the code can be any number of characters (e.g., 2 to 4 characteristics to facilitate manual entry). As shown, entry of the session code causes the audio payment manager 109a to generate an audio token and display a user interface 917 alerting the user to, for instance, attach the UE 101 to the acoustic coupler 113 of the merchant terminal 111. On doing so, an audio connection 915 is established between the audio payment manager 109a of the UE 101 and the audio payment manager 109b of the merchant terminal 103. The audio payment manager 109a can then playback the audio token into the acoustic coupler 113 to trigger processing of the payment.

The processing status is display is displayed in a user interface 919. When the transaction is completed, as indicated in step 921, the audio payment manager 109a can display a user interface 923 providing an alert that the transaction has been successfully completed. In one embodiment, the alert of the user interface 923 times out and returns to the initial launch screen 901. From the user interface 901, the user can then select the option 903 to display the passbook which provides, for instance, a record of transactions and transaction receipts as described in note 929.

FIG. 9B depicts a sample use case for a transaction conducted via the user interfaces of FIG. 9A and processes of FIGS. 3-5 for audio token based payment, according to one embodiment. In illustration 941, a customer 943 and a merchant 945 enter into a transaction. In illustration 947, the customer 943 requests payment using an audio based payment system. The merchant 945 enters the transaction amount in the merchant terminal 103 and turns the device to the customer 943 so that the she can see the transaction amount and initiate payment.

In illustration 951, the customer 943 launches the audio payment manager 109a on her UE 101 and views a user interface 953 for entering her PIN code to generate an audio token locally and make the payment. As shown in illustration 955, the customer 943 enters her PIN code and brings her UE 101 close to the terminal 103 to playback the audio token into the terminal 103. The terminal 103 transmits the payment request to the authorization center 107 (not shown in FIG. 9C) and the customer 943 receives a receipt 957 as shown in illustration 959.

The processes described herein for providing an audio token based payment system may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 10:
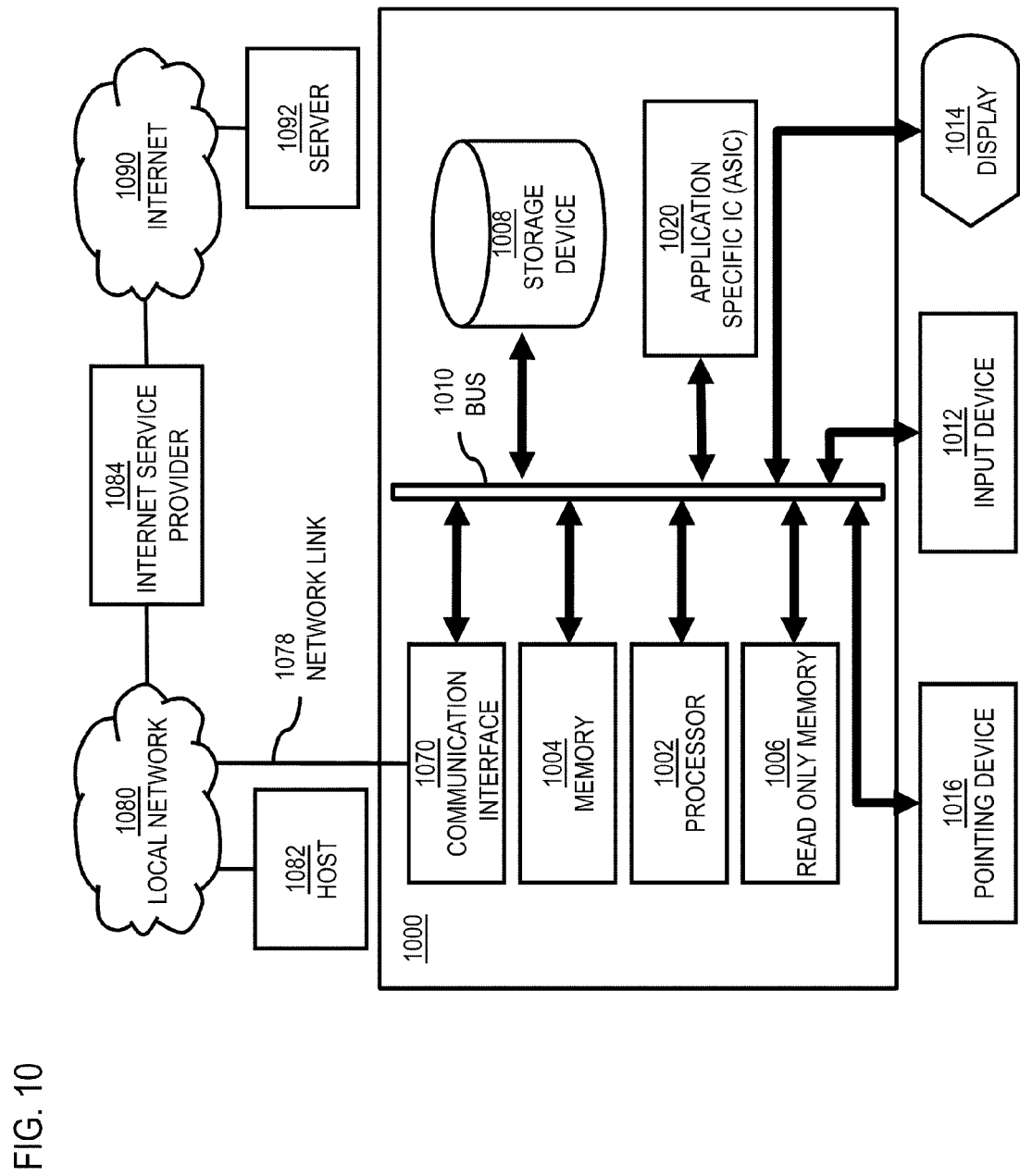
FIG. 10 is a diagram of hardware that can be used to implement an embodiment of the invention.

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to provide an audio token based payment system as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of providing an audio token based payment system.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to providing an audio token based payment system. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or other dynamic storage device, stores information including processor instructions for providing an audio token based payment system. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for providing an audio token based payment system, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 105 for providing an audio token based payment system to the UE 101.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

FIG. 11 illustrates a chip set or chip 1100 upon which an embodiment of the invention may be implemented. Chip set 1100 is programmed to provide an audio token based payment system as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of services. Chip set or chip 1100, or a portion thereof, constitutes a means for performing one or more steps of providing an audio token based payment system.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to provide an audio token based payment system. The memory 1105 also stores the data associated with or generated by the execution of the inventive steps.

Figure 12:
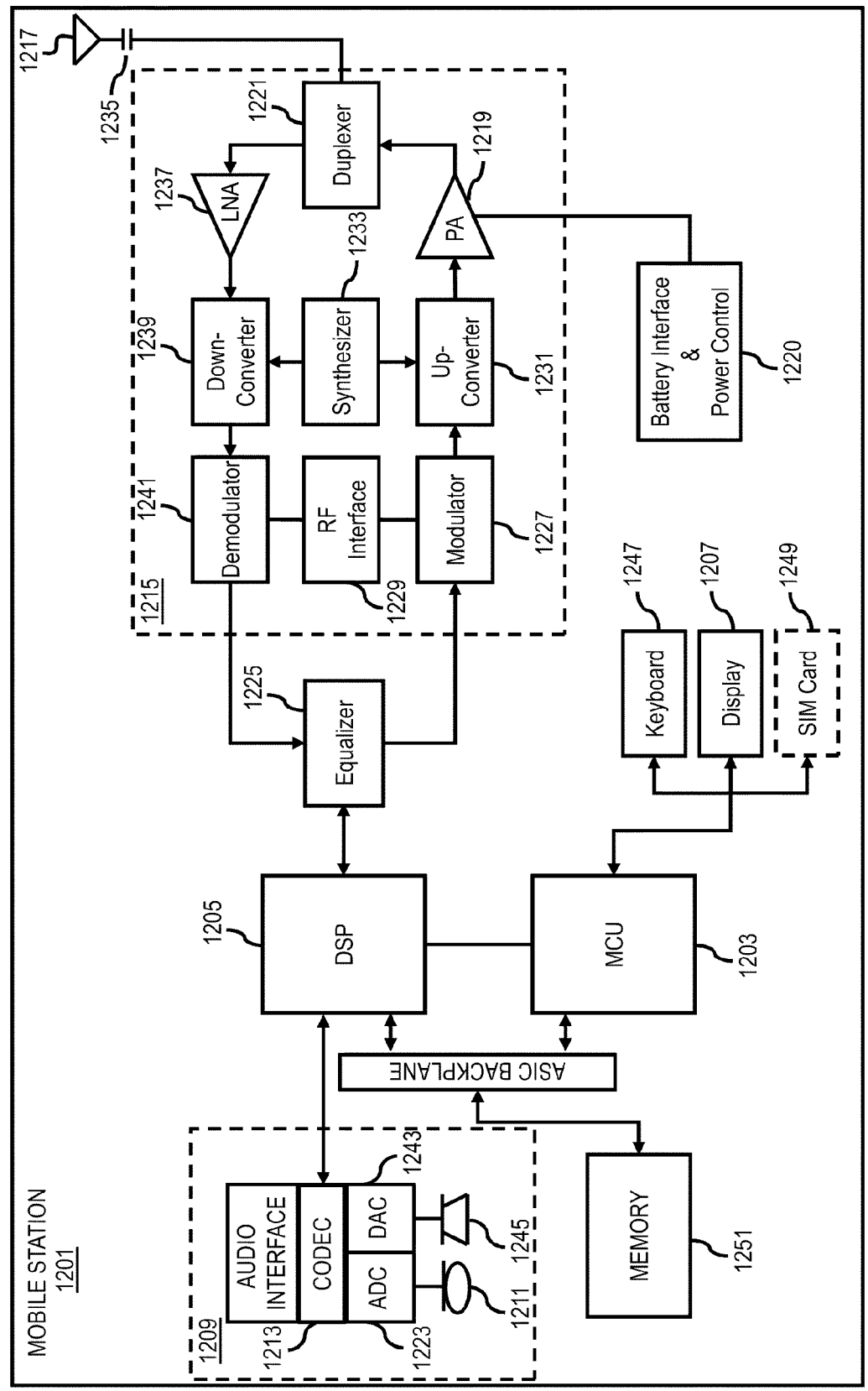
FIG. 12 is a diagram of a mobile terminal (e.g., handset) that can be used to implement an embodiment of the invention.

FIG. 12 is a diagram of exemplary components of a mobile terminal (e.g., handset) for communications, which is capable of operating in the system of FIG. 1, according to one embodiment. In some embodiments, mobile terminal 1200, or a portion thereof, constitutes a means for performing one or more steps of providing an audio token based payment system. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps of providing an audio token based payment system. The display 12 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1225 for compensation of any frequency-dependent impairments that occur during transmission through the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 to provide an audio token based payment system. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving, by a device, a request, the request indicating a password;
   determining, by the device, one or more security risk parameters associated with the received request;
   retrieving, by the device, a personal identification number, an identifier, a session code, or a combination thereof, based, at least in part, on the determined one or more security risk parameters associated with the received request;
   generating, by the device, an audio token based, at least in part, on the received password, the retrieved personal identification number, the identifier, the session code, or the combination thereof;
   conveying, by the device, the generated audio token to a merchant;
   initiating, by the device, payment to the merchant based on the conveyance of the audio token to the merchant; and
   receiving, by the device, a receipt, of the initiated payment.

2. A method of claim 1, further comprising:
   generating a secret key based, at least in part, on the password, the personal identification number, or a combination thereof; and
   generating a message authentication code based, at least in part, on the secret key, the identifier, the session code, the password, or a combination thereof,
   wherein the generation of the audio token is further based, at least in part, on the message authentication code, the identifier associated, the password, or a combination thereof.

3. A method of claim 1, wherein the password is specified as an index number, the method further comprising:
   retrieving the password from a table of pre-defined passwords based, at least in part, on the index number.

4. A method of claim 1, wherein the conveyance of the audio token is via an acoustic coupler between the device and a terminal of the merchant.

5. A method of claim 1, further comprising:
   generating a message to indicate a use of the password with respect to the payment; and transmitting the message to an authentication device,
   wherein an authentication of the payment by the authentication device is based, at least in part, on the message, the session code, or a combination thereof.

6. A method of claim 1, wherein the password is a one-time password—and the receipt includes a replacement for the one-time password, and wherein the one or more security risk parameters include a transaction amount, a transaction frequency, or a combination thereof.

7. An apparatus comprising:
   at least one processor; and
   at least one non-transitory memory containing instructions when executed by the processor, causes the processor to perform the steps of:
   receiving a request, the request indicating a password;
   determining one or more security risk parameters associated with the received request;
   retrieving a personal identification number, an identifier, a session code, or a combination thereof, based, at least in part, on the determined one or more security risk parameters associated with the received request;
   generating an audio token based, at least in part, on the received password, the retrieved personal identification number, the identifier, the session code, or the combination thereof;
   conveying the generated audio token to a merchant;
   initiating payment to the merchant based on the conveyance of the audio token to the merchant; and
   receiving a receipt, of the initiated payment.

8. An apparatus of claim 7, wherein the apparatus is further caused to perform the steps of:
   generating a secret key based, at least in part, on the password, the personal identification number, or a combination thereof; and
   generating a message authentication code based, at least in part, on the secret key, the identifier, the session code, the password, or a combination thereof,
   wherein the generation of the audio token is further based, at least in part, on the message authentication code, the identifier, the password, or a combination thereof.

9. An apparatus of claim 7, wherein the password is specified as an index number, and wherein the apparatus is further caused to perform the step of:
   retrieving the password from a table of pre-defined passwords based, at least in part, on the index number.

10. An apparatus of claim 7, wherein the apparatus is further caused to perform the steps of:
    generating a message to indicate a use of the password with respect to the payment; and transmitting the message to an authentication device,
    wherein an authentication of the payment by the authentication device is based, at least in part, on the message, the session code, or a combination thereof.

11. An apparatus of claim 7, wherein the password is a one-time password, and the receipt includes a replacement for the one-time password, and wherein the one or more security risk parameters include a transaction amount, a transaction frequency, or a combination thereof.

12. An apparatus of claim 7, wherein the apparatus is a mobile phone further comprising:
    user interface circuitry and user interface software that facilitate control of at least some functions of the mobile phone through use of a display and that respond to input; and
    a display and display circuitry that display at least a portion of a user interface of the mobile phone, the display and display circuitry that facilitate control of at least some functions of the mobile phone.

* * * * *